(12) United States Patent
Ohsumi

(10) Patent No.: US 10,754,940 B2
(45) Date of Patent: Aug. 25, 2020

(54) AUTHENTICATION DEVICE AND COMPUTER-READABLE RECORDING MEDIUM

(71) Applicant: CASIO COMPUTER CO., LTD., Shibuya-ku, Tokyo (JP)

(72) Inventor: Tsuyoshi Ohsumi, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 212 days.

(21) Appl. No.: 15/879,687

(22) Filed: Jan. 25, 2018

(65) Prior Publication Data
US 2018/0253544 A1 Sep. 6, 2018

(30) Foreign Application Priority Data

Mar. 6, 2017 (JP) ................................. 2017-041511

(51) Int. Cl.
*G06F 21/41* (2013.01)
*H04L 29/06* (2006.01)

(52) U.S. Cl.
CPC ............ *G06F 21/41* (2013.01); *H04L 63/083* (2013.01); *H04L 63/0815* (2013.01); *H04L 63/0884* (2013.01)

(58) Field of Classification Search
CPC ... G06F 21/41; H04L 63/0815; H04L 63/083; H04L 63/0884

(Continued)

(56) References Cited

U.S. PATENT DOCUMENTS 7,231,595 B1 * 6/2007 Fujino .................. G06F 21/41
715/200
7,490,347 B1 2/2009 Schneider et al.
(Continued)

FOREIGN PATENT DOCUMENTS

JP 09274628 A 10/1997
JP 2001118009 A 4/2001
(Continued)

OTHER PUBLICATIONS

Making readability indicies readable Sara Tonelli, Ke Tran Manh, Emanuale Pianta Proceedings of the First Workshop on Predicting and improving Text Readability for target reader populations. Jun. 2012, pp. 40-48 (Year: 2012).*

(Continued)

*Primary Examiner* — Kambiz Zand
*Assistant Examiner* — Mohammad S Shams
(74) *Attorney, Agent, or Firm* — Holtz, Holtz & Volek PC

(57) ABSTRACT

An authentication device includes a first login module and a second login module. Upon a login request accompanied by entry of correct authentication information on any one of accounts, the first login module approves a request for first login using the account in account information, the account information comprising the registered accounts distinguished between one or more first accounts and one or more second accounts, the second accounts being allowed for proxy login using the first accounts. Upon a further request for login using any one of the first accounts in a login session started by the first login using any one of the second accounts, the second login module approves a request for second login using the first account, the first account having a preset proxy for approving the proxy login using the second account in the account information.

6 Claims, 13 Drawing Sheets

(58) Field of Classification Search
USPC .................................................. 726/8
See application file for complete search history.

(56) References Cited

U.S. PATENT DOCUMENTS

| | | | |
|---|---|---|---|
| 7,788,484 B2 | 8/2010 | Paya et al. | |
| 8,086,635 B1* | 12/2011 | Rinker | G06F 21/604 |
| | | | 707/783 |
| 8,249,961 B1* | 8/2012 | Hopkins | G06Q 20/227 |
| | | | 235/380 |
| 8,631,478 B2* | 1/2014 | Chen | H04L 63/0281 |
| | | | 726/6 |
| 9,369,457 B2 | 6/2016 | Grajek et al. | |
| 9,742,767 B1 | 8/2017 | Li et al. | |
| 9,906,503 B1* | 2/2018 | Thayer | H04L 63/0428 |
| 10,061,931 B2* | 8/2018 | Uchikawa | H04N 1/00244 |
| 10,070,310 B2 | 9/2018 | Powell et al. | |
| 10,250,584 B2* | 4/2019 | Mikheev | H04L 63/0815 |
| 10,469,497 B2* | 11/2019 | Yedidi | H04L 63/083 |
| 2003/0088517 A1* | 5/2003 | Medoff | G06Q 40/06 |
| | | | 705/59 |
| 2004/0117615 A1 | 6/2004 | ODonnell et al. | |
| 2004/0128542 A1* | 7/2004 | Blakley, III | H04L 63/0281 |
| | | | 726/12 |
| 2007/0234417 A1 | 10/2007 | Blakley et al. | |
| 2009/0164382 A1* | 6/2009 | Sally | G06Q 20/24 |
| | | | 705/67 |
| 2010/0148922 A1* | 6/2010 | Yamada | G06F 21/32 |
| | | | 340/5.82 |
| 2011/0154459 A1 | 6/2011 | Kuang et al. | |
| 2011/0182284 A1* | 7/2011 | Lee | H04W 4/00 |
| | | | 370/352 |
| 2013/0152174 A1 | 6/2013 | Raley et al. | |
| 2014/0020078 A1* | 1/2014 | Canning | H04L 63/0815 |
| | | | 726/8 |
| 2014/0245389 A1 | 8/2014 | Oberheide et al. | |
| 2014/0341373 A1* | 11/2014 | Song | H04L 9/0869 |
| | | | 380/28 |
| 2015/0089610 A1 | 3/2015 | Desoto et al. | |
| 2016/0134619 A1* | 5/2016 | Mikheev | H04L 63/0815 |
| | | | 726/8 |
| 2016/0300224 A1* | 10/2016 | Liu | G06F 21/34 |
| 2016/0366134 A1* | 12/2016 | Hughes | H04M 15/00 |
| 2017/0118029 A1* | 4/2017 | Salmi | H04L 67/42 |
| 2017/0346821 A1* | 11/2017 | Yedidi | H04L 63/083 |
| 2018/0227286 A1* | 8/2018 | Ohsumi | H04L 63/08 |

FOREIGN PATENT DOCUMENTS

| | | |
|---|---|---|
| JP | 2002222168 A | 8/2002 |
| JP | 2004013298 A | 1/2004 |
| JP | 2004288059 A | 10/2004 |
| JP | 2008003810 A | 1/2008 |

OTHER PUBLICATIONS

Privacy managment for portable recording devices J. Alex Halderman, Brent Waters, Edward W. Felten WPES'04: Proceedings of the 2004 ACM workshop on Privacy in the electronic society. pp. 16-24 (Year: 2004).*

Japanese Office Action (and English language translation thereof) dated Dec. 10, 2019 issued in counterpart Japanese Application No. 2017-041511.

Office Action (Non-Final Rejection) dated Oct. 29, 2019 issued in U.S. Appl. No. 15/876,531.

* cited by examiner

FIG.4A

| SPECIALIST ACCOUNT(ID) | EMAIL ADDRESS | PASSWORD | NAME | PROXY ESTABLISHMENT | DEPENDENT ACCOUNT | | | |
|---|---|---|---|---|---|---|---|---|
| A001 | aaa@···.co.jp | aaaaaaaa | AA BB | YES | | | | |
| A002 | bbb@···.com | bbbbbbbb | CC DD | NO | B014 | B035 | | |
| A003 | ccc@···.co.jp | cccccccc | EE FF | NO | | | | |
| A004 | ddd@···.com | dddddddd | GG HH | NO | | | | |
| A005 | eee@···.com | eeeeeeee | KEIGO AIDA | YES | B017 | B025 | B044 | B103 |
| ··· | ··· | ··· | ··· | ··· | ··· | ··· | ··· | ··· |

FIG.4B

| GENERAL ACCOUNT(ID) | EMAIL ADDRESS | PASSWORD | NAME |
|---|---|---|---|
| B001 | fff@···.co.jp | ffffffff | II JJ |
| B002 | ggg@···.com | gggggggg | LL MM |
| B003 | hhh@···.co.jp | hhhhhhhh | NN OO |
| B004 | iii@···.com | iiiiiiii | PP QQ |
| B005 | kkk@···.com | kkkkkkkk | RR SS |
| ··· | ··· | ··· | ··· |
| B017 | sss@···.ne.jp | ssssssss | KAZUO SATO |
| ··· | ··· | ··· | ··· |

FIG.5

| REGISTRANT (ID) | REGISTERED DATE | TARGETED REGISTRANT(ID) | DEADLINE | SIGNIFICANCE | COMPLETION DATE | MESSAGE | OPERATIONAL RELATION | ATTACHMENT | URL |
|---|---|---|---|---|---|---|---|---|---|
| ... | ... | ... | ... | ... | ... | ... | ... | ... | ... |
| B017 | 2017/1/5 | B017 | 2017/1/12 | 2 | 2017/1/12 | CHECK FOR LEDGER | ACCOUNTING | NONE | https://ww... |
| B017 | 2017/1/6 | B017 | 2017/1/13 | 1 | 2017/1/13 | GENERATE SHOP POP | POP | NONE | https://ww... |
| B017 | 2017/1/10 | B017 | 2017/1/17 | 2 | N/A | CHECK FOR LEDGER | ACCOUNTING | NONE | https://ww... |
| B017 | 2017/1/10 | B017 | 2017/1/25 | 3 | N/A | TRANSFER SALARIES FOR JANUARY | SALARY | NONE | https://ww... |
| B017 | 2017/1/10 | B017 | 2017/1/31 | 2 | N/A | CREATE PRICE CARD | POP | NONE | https://ww... |
| ... | ... | ... | ... | ... | ... | ... | ... | ... | ... |

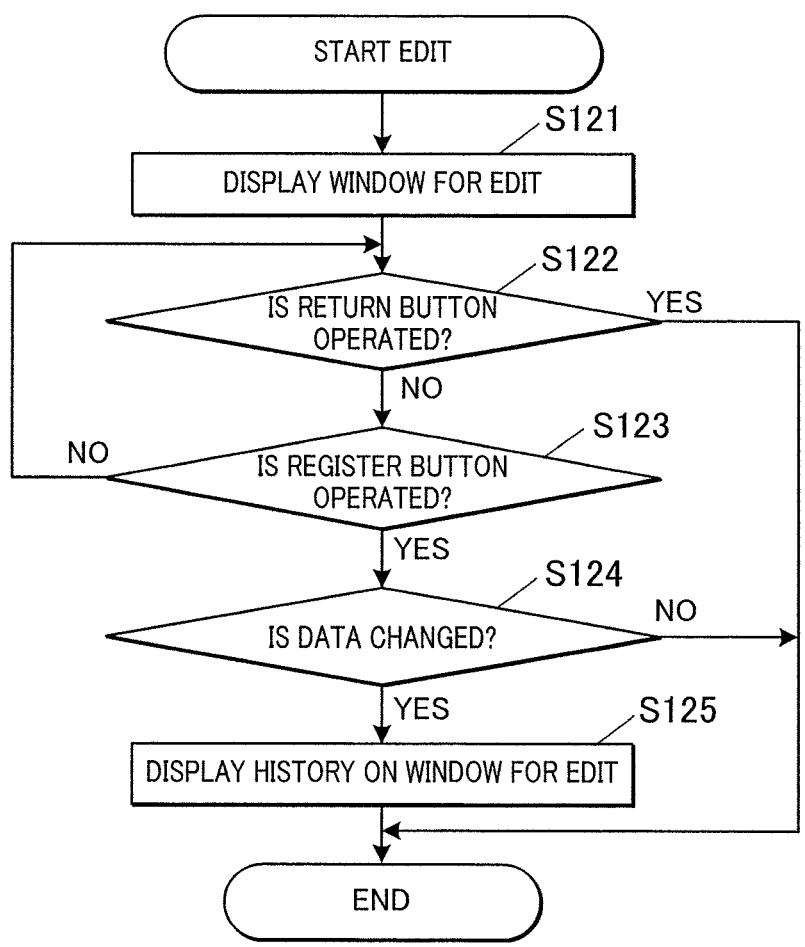

FIG.13

AUTHENTICATION DEVICE AND COMPUTER-READABLE RECORDING MEDIUM

CROSS-REFERENCE TO RELATED APPLICATIONS

This application is based upon and claims the benefit of priority from the prior Japanese Patent Application No 2017-041511, filed on Mar. 6, 2017, the entire contents of which are incorporated herein by reference.

BACKGROUND OF THE INVENTION

1. Field of the Invention

The present invention relates to an authentication device authenticating accounts and a computer-readable recording medium.

2. Description of the Related Art

Traditional systems store data related to various operations, for example, financial accounting, tax practice, and personnel in an enterprise (general user), such as the self-employed and corporations, from general user terminals into servers for management. A technique using such a system enables the joint management of the data on a server by both the general user and specialist users familiar with the operations (for example, tax attorneys, certified public accountants, and public consultants on social and labor insurance) and enables the specialist users to edit the data (for example, prepare and update the data) to relieve the burdens of both the general user and specialist users managing the data (see, for example, Japanese Unexamined Patent Application Publications No. 2004-13298 and No. Hei-9-274628).

In such a technique, authentication devices are used that permit only the general user and specific specialist users having the authorization for data edit from the general user to access the general user data. In detail, separate accounts providing the access to the general user data are issued for the general user and the specialist users authorized by the general user, and then each of the accounts is authenticated by the corresponding authentication device, thereby enabling only the general user and the specialist users to access the data.

SUMMARY OF THE INVENTION

To achieve at least one of the abovementioned objects, according to an aspect of the present invention, an authentication device includes:

a first login module which approves, upon a login request accompanied by entry of correct authentication information on any one of accounts, a request for first login using the account in account information, the account information comprising the registered accounts distinguished between one or more first accounts and one or more second accounts, the second accounts being allowed for proxy login using the first accounts; and a second login module which approves, upon a further request for login using any one of the first accounts in a login session started by the first login using any one of the second accounts, a request for second login using the first account, the first account having a preset proxy for approving the proxy login using the second account in the account information.

According to another aspect of the present invention, a non-transitory computer-readable recording medium stores a computer program that causes a computer in an authentication device to execute:

a first login process of approving, upon a login request accompanied by entry of correct authentication information on any one of accounts, a request for first login using the account in account information, the account information comprising the registered accounts distinguished between one or more first accounts and one or more second accounts, the second accounts being allowed for proxy login using the first accounts; and a second login process of approving, upon a further request for login using any one of the first accounts in a login session started by the first login using any one of the second accounts, a request for second login using the first account, the first account having a preset proxy for approving the proxy login using the second account in the account information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 4A illustrates a specialist account data table.

FIG. 4B illustrates a general account data table.

FIG. 5 illustrates a task database.

FIG. 11 is a flowchart illustrating processes of edit.

FIG. 12A and FIG. 12B illustrate example windows appearing on the terminal when customer data is edited.

FIG. 13 illustrates an example window appearing on the terminal when the customer data is edited.

DETAILED DESCRIPTION OF THE PREFERRED EMBODIMENTS

An embodiment of an authentication device and a computer-readable recording medium according to the present invention will now be described in reference to the accompanying drawings.

A management supporting system 1 according to the present embodiment will now be described in reference to FIG. 1.

Figure 1:
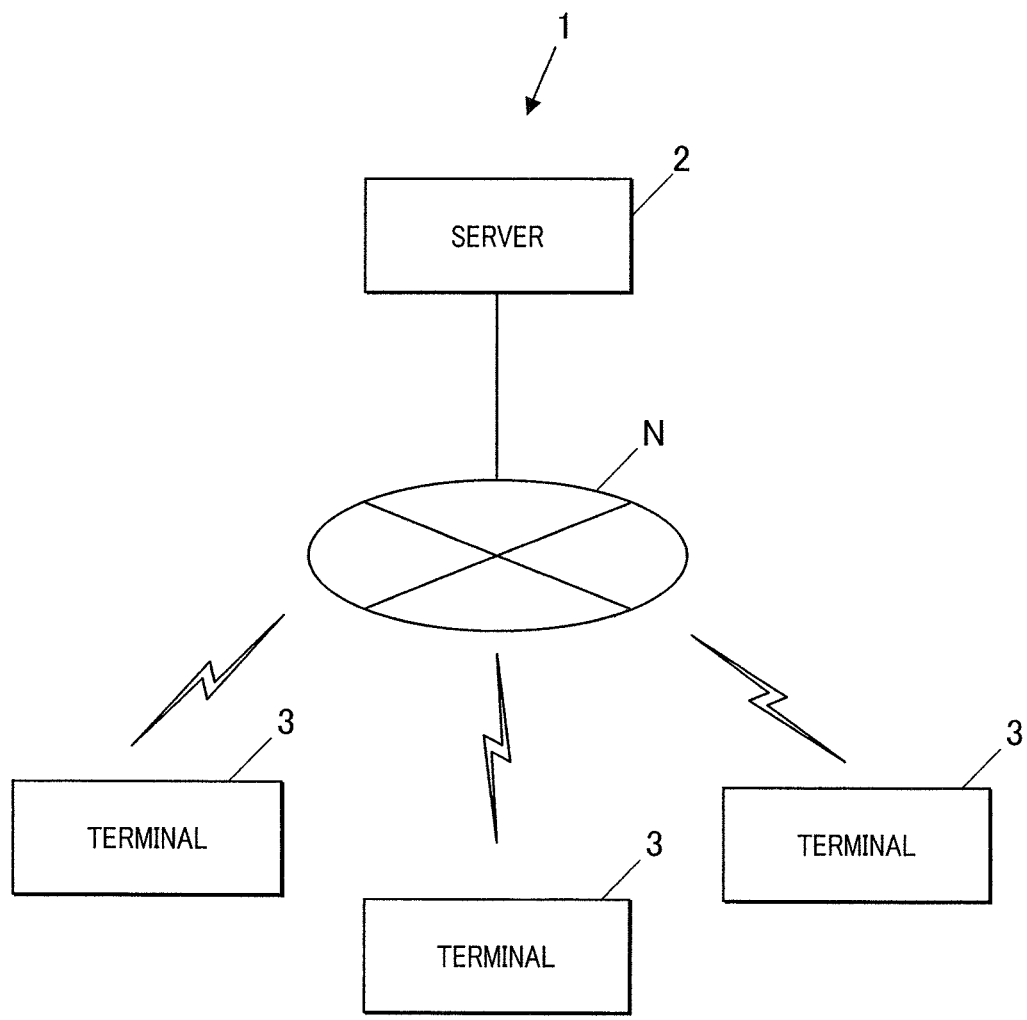
FIG. 1 is a block diagram of a management supporting system according to the present invention.

FIG. 1 illustrates a schematic block diagram of the management supporting system 1.

As illustrated in FIG. 1, the management supporting system 1 of the embodiment includes a server 2 (authentication device) and two or more terminals 3. The server 2 is connected with the terminals 3 through a communication network N. The management supporting system 1 stores various business data related to operations, for example, financial accounting, tax practice, and personnel in an enterprise, such as the self-employed, a small or medium sized corporation, and a one-man concern (hereinafter referred to as "general user"), into the server 2, to achieve a cloud service capable of joint management of the business data by the general user and specialists whom the general user entrusts with services, for example, tax attorneys, certified public accountants, public consultants on social and labor insurance, and other consultants (hereinafter referred to as "specialist user").

The server 2 is, for example, on a cloud.

The server 2 associates the business data of the general user with his/her account to store and manage the data. The server 2 executes various programs and processes various data (for example, to achieve functions related to generation, inspection, and edit of various business data) to support business administration of the general user.

The terminals 3 are placed at, for example, the above-mentioned general user and specialist users. The terminals 3 may include, for example, smartphones, tablet personal computers (PC), mobile phones, personal digital assistants (PDA), laptop PCs, and desktop PCs. The terminals 3 receive entries by user operations through, for example, a browser, to transmit them to the server 2 and displays the information from the server 2.

The communication network N is the Internet. Alternatively, the communication network N may be other networks, such as a local area network (LAN).

The functions of the server 2 will now be described in reference to FIG. 2.

Figure 2:
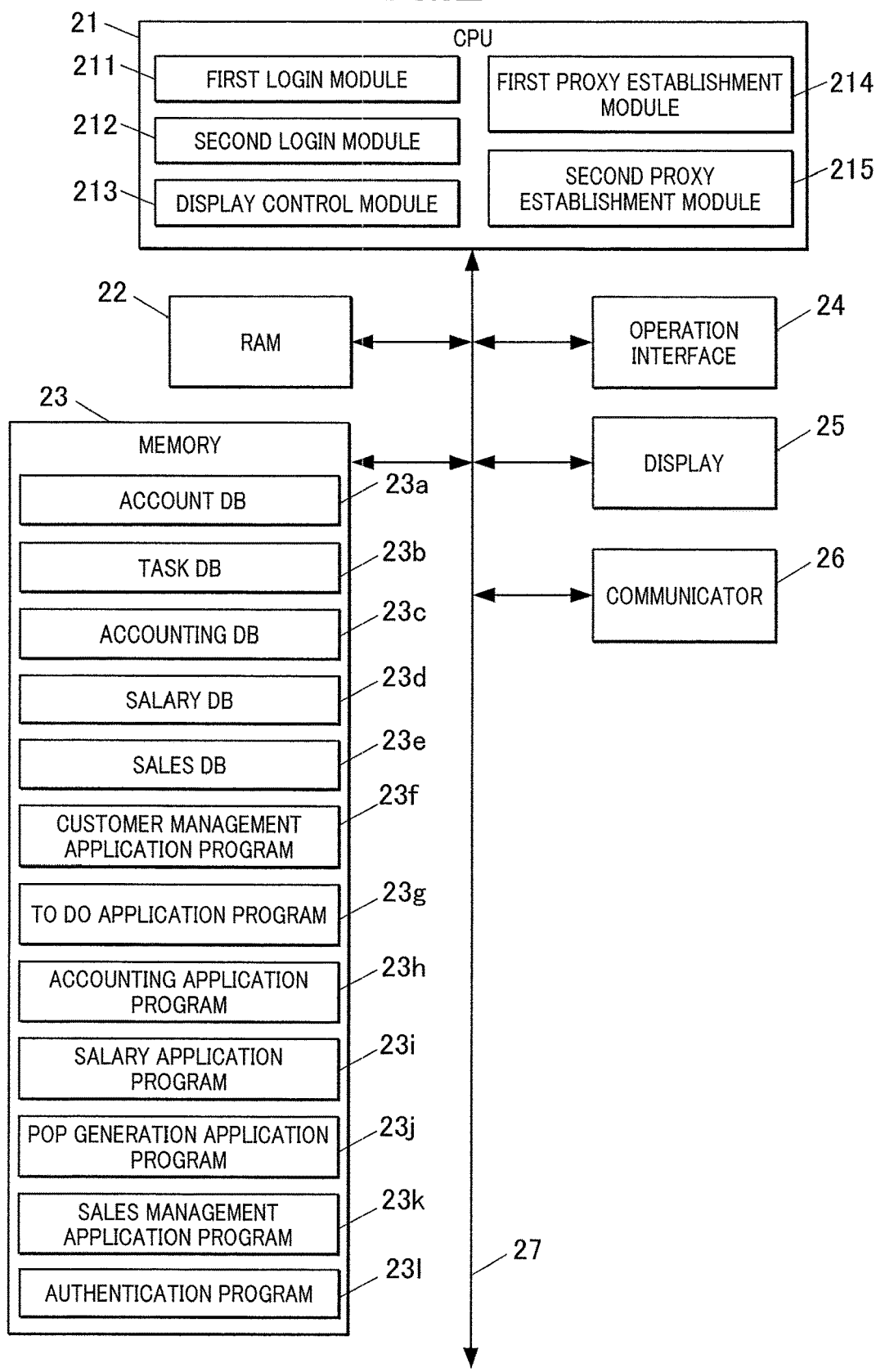
FIG. 2 is a block diagram illustrating the functional configuration of a server.

FIG. 2 is a block diagram illustrating the functional configuration of the server 2 included in the management supporting system 1. As illustrated in FIG. 2, the server 2 includes a central processing unit (CPU) 21 (including a first login module 211, a second login module 212, a display control module 213, a first proxy establishment module 214, a second proxy establishment module 215, and a computer); a random access memory (RAM) 22; an account information memory 23; an operation interface 24; a display 25; and a communicator 26. These components of the server 2 are connected through a bus 27.

The CPU 21 controls the components of the server 2. The CPU 21 reads designated programs of the system programs and application programs stored in the memory 23 to deploy them in the work area of the RAM 22 and processes data under the instruction of the programs.

The RAM 22 is, for example, a volatile memory and serves as a work area for temporarily storing various programs and data read by the CPU 21.

The memory 23 includes a computer-readable recording medium, such as a hard disk drive (HDD) or a solid state drive (SSD), and can write and read data and programs. The memory 23 stores an account database 23a (account information); a task database 23b; an accounting database 23c; a salary database 23d; a sales database 23e; a customer management application program 23f; To Do application program 23g; an accounting application program 23h; a salary application program 23i; a POP generation application program 23j; a sales management application program 23k; and an authentication program 23l.

The account database 23a includes a general account data table (see FIG. 4B) for storing the information on a general user account (first account) and a specialist account data table (see FIG. 4A) for storing the information on a specialist user account (second account).

As illustrated in FIG. 4A, the specialist account data table stores data fields associated with each other, such as "specialist account (ID)" identifying a specialist user, "e-mail address" of the specialist user, "password" used for login authentication of the specialist user, "name" of the specialist user, "proxy establishment" indicating whether the specialist user is set to a proxy performing login for the general user (proxy login), and "dependent account" indicating the general user account capable of proxy login. Hereinafter, the specialist account associated with one or more dependent accounts is also referred to as "proxy account".

As illustrated in FIG. 4B, the general account data table stores data fields associated with each other, such as "general account (ID)" identifying a general user, "e-mail address" of the general user, "password" used for login authentication of the general user, and "name" of the general user.

The task database 23b includes task data tables for sorting To Do tasks for each user. The To Do tasks in this context refer to work to be performed by the users.

FIG. 5 illustrates an example task data table for the general user Mr. "Kazuo Sato" (having the general account "B017").

Figure 10:
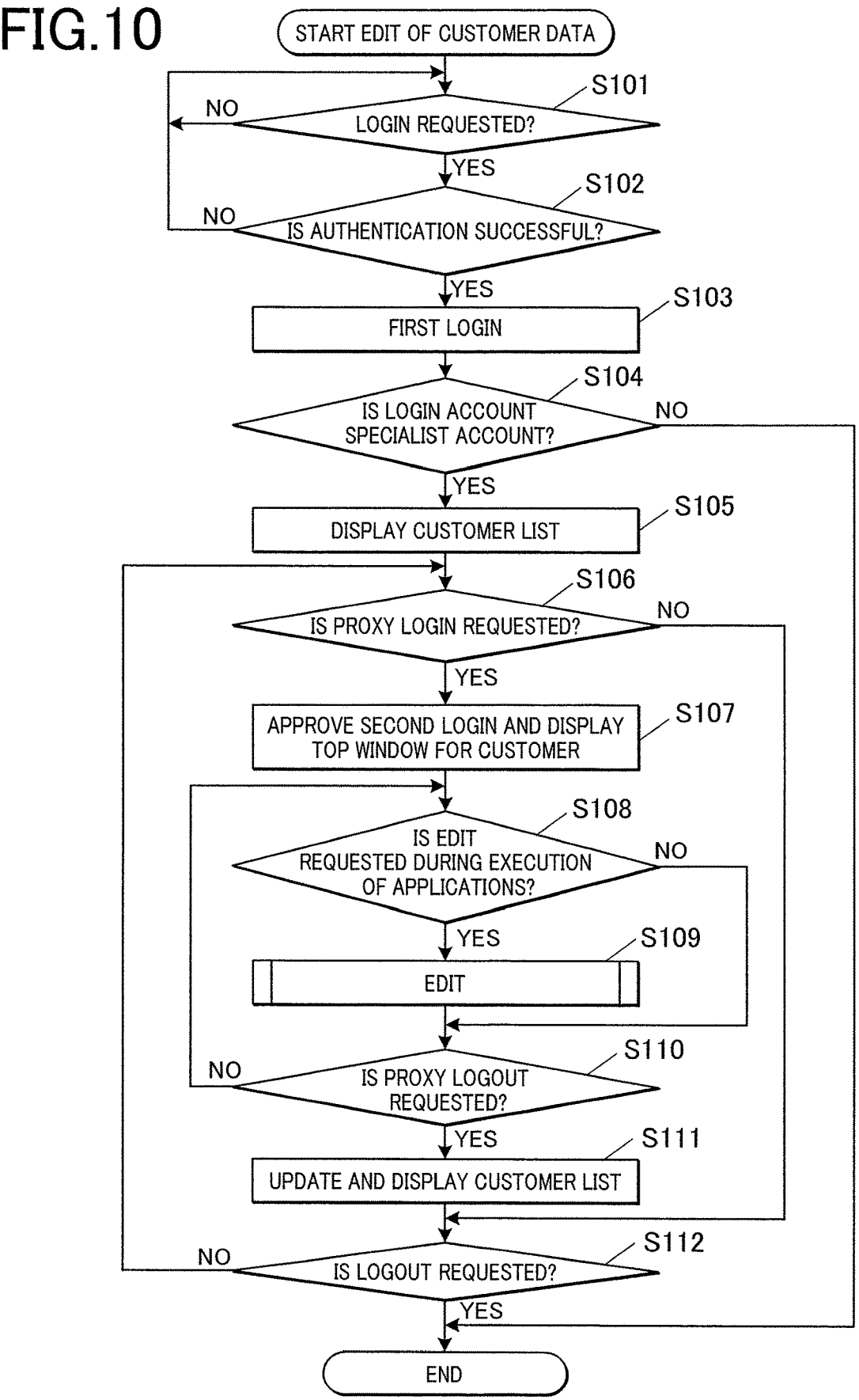
FIG. 10 is a flowchart illustrating processes of edit of customer data.

As illustrated in FIG. 5, the task data table stores data fields associated with each other for each work item to be performed, such as "registrant (ID)" representing the registrant for a specific work item, "registered date" of the work item, "targeted registrant (ID)" representing the registrant for the specific work item, "deadline" for the work item, "significance" of the work item, "completion date" of the work items, "message" indicating the details of the work item, "operational relation" indicating the relation between the operation and the work item, "attachment" indicating attachment of an image, and "URL" indicating the address of the window that changes when the icon Ig provided at one task index Ta (described below with reference to FIG. 7) is operated (clicked or touched) and indicating the location of the data in a To Do task (described below) that prompts the continuation of the data edited (updated) in edit of customer data (hereinafter referred to as To Do task for update confirmation with reference to FIG. 10).

The accounting database 23c stores accounting information used in accounting management.

The salary database 23d stores salary information used in salary management.

The sales database 23e stores sales information used in sales management.

The customer management application program 23f supports management of a customer or a general user by a specialist user. Execution of this program causes a customer list L to appear on a specialist window 354, which will be described below with reference to FIG. 9.

The To Do application program 23g is used for generation and registration of To Do tasks in the task database 23b stored in the memory 23 and displays the To Do tasks.

The accounting application program 23h is used for processes of payment of taxes, such as real estate tax and sole proprietorship tax based on the accounting information stored in the accounting database 23c.

The salary application program 23i is used for calculation of salaries of employees based on the salary information stored in the salary database 23d.

The POP generation application program 23*j* is used for generation of, for example, an advertisement medium of sales promotion for shops or points of purchase advertising (POPs).

The sales management application program 23*k* is used for aggregation and analysis of daily and monthly sales of shops based on sales information stored in the sales database 23*e*.

The authentication program 23*l* is used for approval of first login and second login to the server 2 in response to entries by users on the terminals 3, which will be described below.

The operation interface 24 includes, for example, a key entry unit, such as a key board, and a pointing device, such as a mouse. The operation interface 24 receives key entries and position entries and outputs operational information from the entry operations to the CPU 21.

The display 25 includes, for example, a liquid crystal display (LCD) or an organic electroluminescent display (OELD). The display 25 presents various windows in response to display signals from the CPU 21.

The communicator 26 includes, for example, a network card. The communicator 26 communicates with devices (such as terminals 3) through the communication network N.

The functions of the terminals 3 will now be described in reference to FIG. 3.

Figure 3:
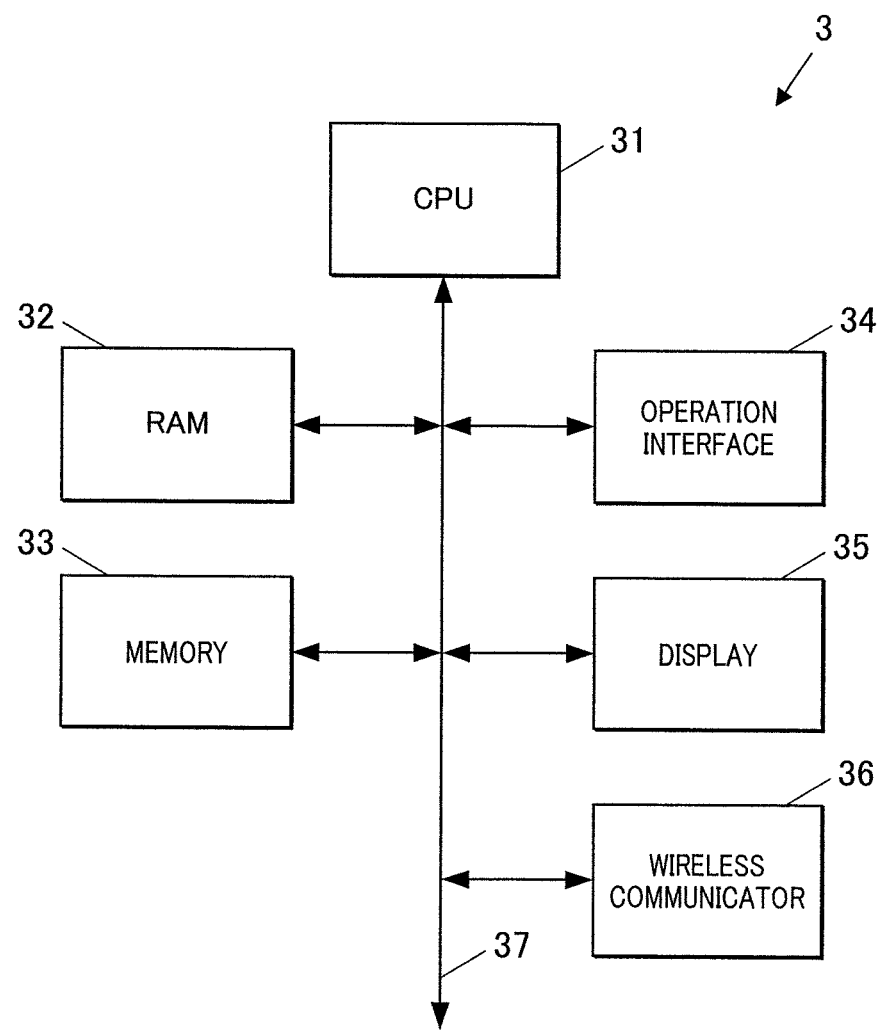
FIG. 3 is a block diagram illustrating the functional configuration of a terminal.

FIG. 3 is a block diagram illustrating functional configuration of the terminals 3 included in the management supporting system 1.

As illustrated in FIG. 3, the terminals 3 each include, for example, a CPU 31, a RAM 32, a memory 33, an operation interface 34, a display 35, and a wireless communicator 36. These components of the terminals 3 are connected through a bus 37.

The CPU 31 controls the components of the terminal 3. The CPU 31 reads designated programs of the system programs and application programs stored in the memory 33 to deploy them in the work area of the RAM 32 and processes data under the instruction of the programs. The CPU 31 stores results of the processes in the RAM 32 and causes the results to appear on the display 35 as required.

The RAM 32 is, for example, a volatile memory and serves as a work area for temporarily storing various programs and data read by the CPU 31.

The memory 33 includes, for example, a flash memory or an electrically erasable programmable read only memory (EEPROM) and can read and write data and programs. The memory 33 also stores a program for displaying and entering information (not shown). This program is a so-called web browser achieving functions to receive entry by user operation, transmit the information based on the entry to the server 2, and present the information from the server 2 on the display 35.

The operation interface 34 includes, for example, a touch panel to receive touch entry from a user and output the entered information to the CPU 31.

The touch panel is integrated with the display 35 and indicates the position touched by the user on the display 35 where the position is represented by the XY coordinates. The touch is detected, for example, by electrostatic capacitance, or with resistive films or ultrasonic surface acoustic waves. The touch panel outputs position signals related to the touched position on the XY coordinates to the CPU 31.

The display 35 includes, for example, a LCD and an OELD. The display 35 also presents various windows in response to display signals from the CPU 31.

The wireless communicator 36 includes, for example, an antenna, a modulation/demodulation circuit, and a signal processing circuit. The wireless communicator 36 communicates with devices (such as the server 2) in the communication network N through radio transmission of data to/from, for example, base stations and access points via the communication network N.

The operation of the management supporting system 1 will be described in reference to FIGS. 6 to 9, where the general user and the specialist user log into the server 2 with their accounts (general account and specialist account).

Figure 6:
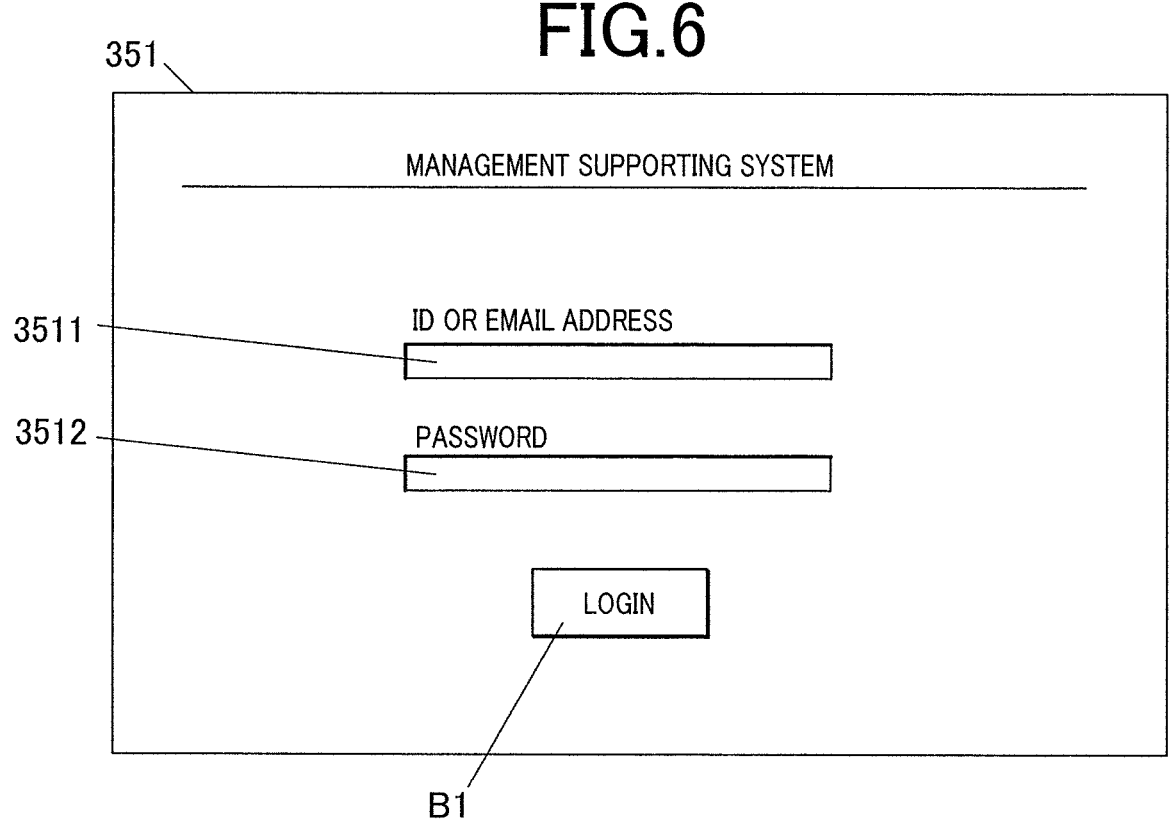
FIG. 6 illustrates a login window for first login.

FIG. 6 illustrates a login window 351 for performing login with the general account and the specialist account.

The login window 351 appears on the display 35 if a browser program is executed on the terminals 3 and if a predetermined website is accessed for login to the server 2. The login window 351 includes a text box 3511 into which an account ID or an e-mail address is entered, a text box 3512 into which a password is entered, and a login button B1. In the present embodiment, the authentication information consists of a combination of an ID or e-mail address and a password.

Through entry on the operation interface 34 on the terminal 3, an ID or e-mail address is entered into the text box 3511 and a password into the text box 3512. If the login button B1 is selected in this state, the entered authentication information is transmitted to the server 2 and compared with the authentication information stored in the account database 23*a* on the server 2. If the entered authentication information matches the authentication information corresponding to either the general account or the specialist account (i.e., if the entered authentication information is correct), then the CPU 21 in the server 2 causes the login with the account to be performed and the login session to start. Hereinafter, the login in this mode is referred to as first login. In other words, the process for performing the first login through the CPU 21 is referred to as a first login process.

In the management supporting system 1 according to the present embodiment, the first login by either the general account or the specialist account causes the display 35 of the terminal 3 to present a predetermined window (top window) depending on the account types.

Figure 7:
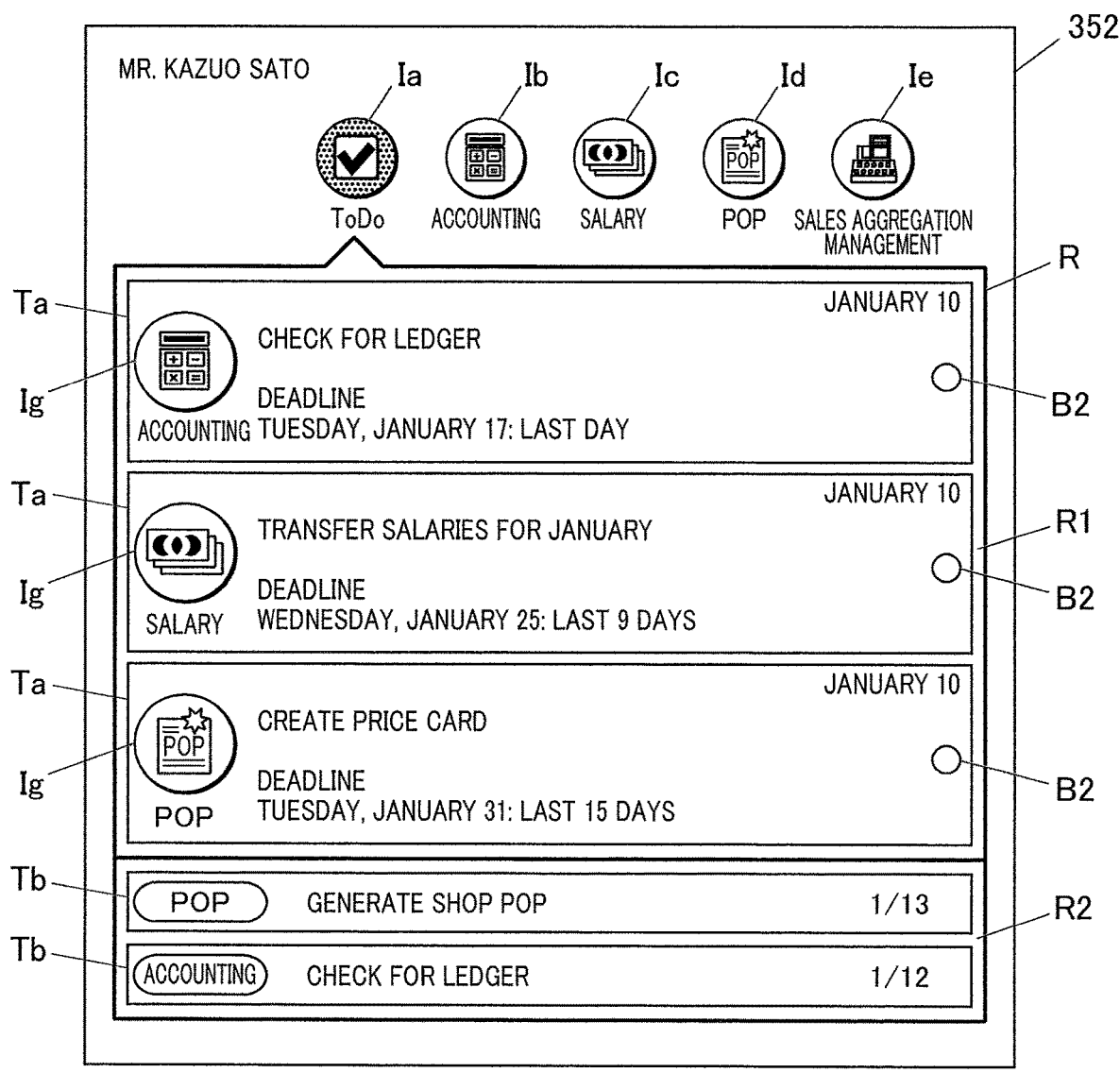
FIG. 7 illustrates a general user window (top window) displayed after login to the server by a general account.
Figure 9:
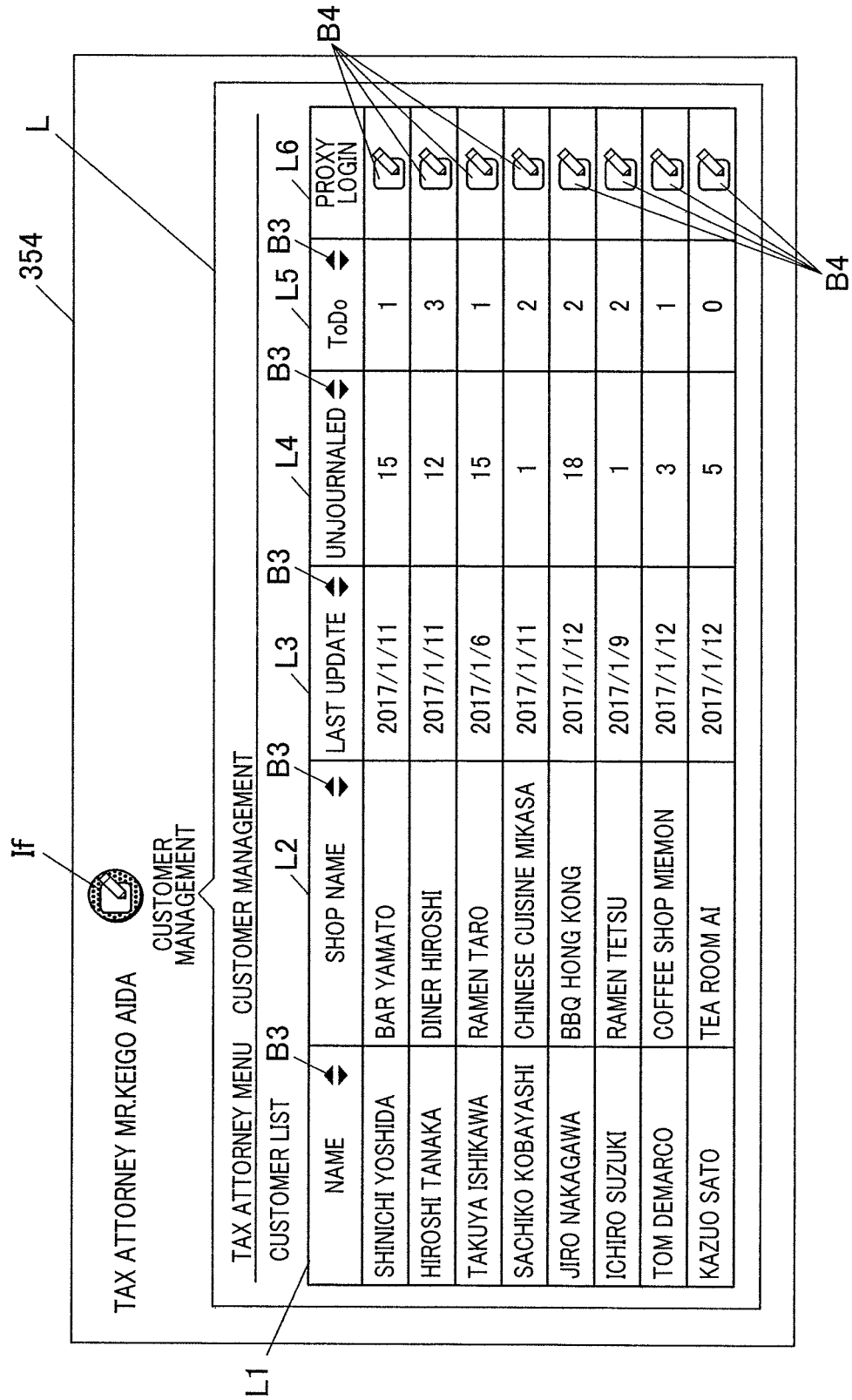
FIG. 9 illustrates a specialist window (top window) displayed after login to the server by a specialist account.

FIG. 7 illustrates a window (a general user window 352) displayed when the general account performs login to the server 2. FIG. 9 illustrates a window (a specialist window 354) displayed when the specialist account performs login to the server 2.

<Login Operation with the Account of the General User>

If the general user account (general account) performs login to the server 2 (first login), the login causes the To Do application program 23*g* to be executed. As illustrated in FIG. 7, the display 35 of the terminal 3 presents the general user window 352 (the predetermined initial window) including a To Do application window.

On the top of the To Do application window, a menu bar is disposed including icons for executing the To Do application program 23*g*, the accounting application program 23*h*, the salary application program 23*i*, the POP generation application program 23*j*, and the sales management application program 23*k*, which are described above. In detail, the menu bar includes an icon Ia for executing the To Do application program 23*g*, an icon Ib for executing the accounting application program 23*h*, an icon Ic for executing the salary application program 23*i*, an icon Id for executing the POP generation application program 23*j*, and an icon Ie for executing the sales management application program 23*k*. While the To Do application program 23*g* is being executed, the corresponding icon Ia is displayed in a different manner from the other icons Ib to Ie and thus cannot be clicked or touched on the To Do application window of FIG. 7.

If a user clicks or touches any icon of the menu bar, the current window can be switched to a predetermined process window corresponding to the icon. For example, selection of the icon Ib on the menu bar activates the accounting application program 23h and displays an accounting application window 353 illustrated in FIG. 8. The accounting application window 353 includes function icons 3531 for performing processes for various functions. In detail, the function icons 3531 represent their functions, for example, entry and correction of new transactions, inspection and edit of general ledgers and journals, generation and inspection of consumption tax summary sheets and the trial balance of balances, inspection and edit of cash books, expense books, payable books, receivable books, deposit account books. User click or touch of any of the function icons 3531 starts the process corresponding to the selected function icon 3531 and switches the accounting application window 353 to the window corresponding to the process. For example, selection of the icon Ia on the accounting application window 353 activates the To Do application program 23g and switches the accounting application window 353 to the To Do application window of FIG. 7.

Below the menu bar of the To Do application window, a task index list region R is disposed that indicates task indices summarizing To Do tasks. An upper region R1 of the task index list region R presents, for example, the indices of the unexecuted tasks in the order of shorter deadlines (ascending order). A lower region R2 of the task index list region R presents, for example, the indices of the executed tasks in the descending order of the execution dates. It should be noted that the indices of the executed tasks are automatically deleted after the elapse of a predetermined period from the execution date (for example, a week).

On the illustrative window of FIG. 7, the upper region R1 presents, for example, task indices Ta of unexecuted tasks with the deadlines of Tuesday, January 17, Wednesday, January 25, and Tuesday, January 31. The task indices Ta include details of the tasks to be executed, the icons Ig for switching to a predetermined application window (the window associated with the tasks to be executed), and a task completion button B2 to be selected when a task is completed. The lower region R2 also displays task indices Tb for two executed tasks. The task indices Tb include the details of the executed tasks and the abbreviations of the applications executing the tasks (for example, "accounting", "salary", and "POP").

If the number of task indices listed is larger than the task indices that can be displayed in the upper region R1 or lower region R2 of the task index list region R, the list of the task indices is scrollable. It should be noted that the task index list region R may display only the indices of unexecuted tasks and the indices of the executed tasks may be deleted or hidden from the list. In this case, a button for displaying the indices of the executed tasks should preferably be provided.

<Login Operation with the Specialist User Account>

The login to the server 2 with the specialist user account (specialist account), which is referred to as the first login above, causes the customer management application program 23f to be executed. As illustrated in FIG. 9, the display 35 of the terminal 3 presents the specialist window 354. On the top of the specialist window 354, an icon If is disposed that indicates execution of the customer management application program 23f. The customer list L of the specialist users performing the login is disposed below the icon If. It should be noted that the specialist window 354 may hide the icon If to display only the customer list L.

Before display of the customer list L, all the dependent accounts are identified that have proxies established for the specialist user accounts performing login in reference to the specialist account data table in FIG. 4A. The customer list L presents the information on all the identified dependent accounts. The customer list L according to the present embodiment includes "Name" L1 representing general users corresponding to the dependent accounts, "Shop name" L2 representing the general users managing, for example, shops, "Last update time" L3 representing the date of the last login to the server 2, "Unjournaled" L4 representing the number of unexecuted journal tasks, "To Do" L5 representing the number of unexecuted tasks among the To Do tasks registered when a specialist user logs in with the proxy of the general user (To Do tasks for which a deadline is set), and "Proxy login" L6 provided with one or more proxy login buttons B4 (proxy login tag (s)) for performing login with the proxy of the general user, all associated with each other. The sorting button B3 appearing at the right end of the column of "Name" L1 causes customer names to be sorted according to a predetermined order (for example, in the alphabetic order). "Shop name" L2, "Last update time" L3, "Unjournaled" L4, and "To Do" L5 each have the same sorting button B3.

When the specialist user clicks or touches (entry operation) to select the proxy login button B4 corresponding to a specific dependent account on the customer list L, the login process using the dependent account is performed without entry of authentication information. Hereinafter, the login performed in response to selection of the proxy login button B4 will be referred to as second login, and the process of performing the second login through the CPU 21 is referred to as a second login process. The second login with the dependent account causes the general user window 352 corresponding to the dependent account (see FIG. 7) to be displayed. Various application programs on the menu bar are executed on the displayed general user window 352, and the business data of a general user corresponding to the dependent account can thereby be inspected and edited. In this manner, the specialist user can perform the first login with his/her own account and subsequently select the proxy login button B4 for the second login with the dependent account of the general user or a customer, which facilitates access to the business data of the general user.

The management supporting system 1 according to the embodiment is configured such that the specialist user performing the login with the specialist account (proxy account) can manage the general account of the customer on the customer list L but cannot edit his/her own data with applications, such as the accounting application program 23h. In this manner, the usable functions in the case of the login with the specialist account can be limited, which allows the specialist user to readily perform only the processes related to the necessary functions for customer management.

<Operation Related to Proxy Establishment>

The operation of proxy establishment in the management supporting system 1 will now be described.

A proxy can be established in the account database 23a as follows. A general user performs the first login with his/her own general account to start a login session. The general user enters the e-mail address corresponding to a specialist user of interest on a predetermined entry form, and then establishment of the proxy starts.

If the entered e-mail address matches any of the e-mail addresses associated with the existing specialist accounts, e-mail for acceptance of proxy establishment is transmitted to the specialist user corresponding to the entered e-mail address and prompts him/her to accept proxy establishment between the general account and the specialist account. The e-mail for acceptance includes the URL of a website for accepting the established proxy (appearing on a control window). The specialist user then accesses the website and performs a predetermined entry to accept the proxy establishment, and the specialist account corresponding to the entered e-mail address or proxy account is associated with the general account or a dependent account in the account database 23a.

If the entered e-mail address matches none of the unique e-mail addresses associated with the existing specialist accounts, e-mail for invitation to proxy establishment including the URL of a website for generating an account (appearing on the control window) is transmitted to the specialist user at the entered e-mail address to generate a new specialist account. The e-mail for invitation includes the description prompting the specialist user to accept generation of a specialist account in the management supporting system 1 and proxy establishment between the general account and the generated specialist account. The specialist user then accepts the invitation, performs a predetermined entry at the website and generates a new specialist account, and the new specialist account or proxy account is added to the specialist account data table and associated with the general account or dependent account.

Such requests for acceptance or invitation for setting a specialist account to a proxy account will be hereinafter referred to as "proxy invitation".

The requests for acceptance and invitation also enable a specialist user having a specialist account to identify the general user and establish a proxy to associate his/her specialist account with the general account. Hereinafter, such requests for acceptance or invitation of setting another account to a dependent account will be referred to as "invitation to dependence".

The account database 23a according to the present embodiment manages the specialist account and the general account on separate data tables. Only the specialist account can be a proxy account, whereas only the general account can be a dependent account. The proxy establishment of the embodiment cannot set an existing proxy account to a dependent account (through an invitation to proxy from the specialist account or through an invitation to dependence to a specialist account) and cannot set a general account to a proxy account (through invitation to dependence from the general account or through invitation to proxy to the general account). This prevents the establishment of proxies, such as multi-tiered proxies and mutual proxies.

It should be noted that the e-mails for acceptance or invitation may include, instead of the URL of the website, other pieces of information (for example, the procedures for accepting an established proxy and for generating an account in the management supporting system 1 or a pass code necessary for acceptance of the established proxy and generation of the account) related to, for example, the control window to accept proxy establishment or generate an account.

<Edit of Customer Data>

Edit of customer data through the management supporting system 1 will now be described in reference to FIG. 10.

The customer data is edited in cooperation with the customer management application program 23f read from the memory 23 by the CPU 21 and deployed in the RAM 22 as required and various application programs (such as the accounting application program 23h).

The CPU 21 checks for authentication information entered for a login request on the login window 351 appearing on the display 35 of the terminal 3 (step S101).

If the login is not requested in step S101 (step S101; NO), the CPU 21 repeats the determination procedure in step S101.

If the login is requested in step S101 (step S101; YES), the CPU 21 checks for the entered authentication information successfully authenticated (step S102). In the present embodiment, if the entered authentication information matches the authentication information on any one of the accounts stored in the account database 23a, the CPU 21 determines that the authentication information is successfully authenticated.

If the entered authentication information is not successfully authenticated or the authentication fails in step S102 (step S102; NO), the CPU 21 returns to step S101 and repeats the procedure.

If the entered authentication information is successfully authenticated in step S102 (step S102; YES), the CPU 21 approves the first login with the successfully authenticated account (step S103) and checks for the account being a specialist account (step S104).

If the successfully authenticated account is not a specialist account but a general account in step S104 (step S104; NO), the CPU 21 finishes the edit of the customer data and start predetermined processes for the general account.

If the successfully authenticated account is a specialist account (step S104; YES), the CPU 21 causes the specialist window 354 (top window) to appear on the display 35 of the terminal 3 and causes the window to present the customer list L in FIG. 9 (step S105).

The CPU 21 subsequently determines whether proxy login is requested, i.e., whether any one of the proxy login buttons B4 is operated (clicked or touched) on the customer list L (step S106).

If the proxy login is not requested in step S106 (step S106; NO), the procedure proceeds to step S112.

If the proxy login is requested in step S106 (step S106; YES), the CPU 21 approves the second login with a general account of interest on the terminal 3 and causes the To Do application window (the top window in FIG. 7) to be displayed for the general user (for example, Mr. "Kazuo Sato") corresponding to the general account (step S107).

The CPU 21 subsequently checks for a request for edit of data (business data) during execution of application programs (step S108).

Figure 8:
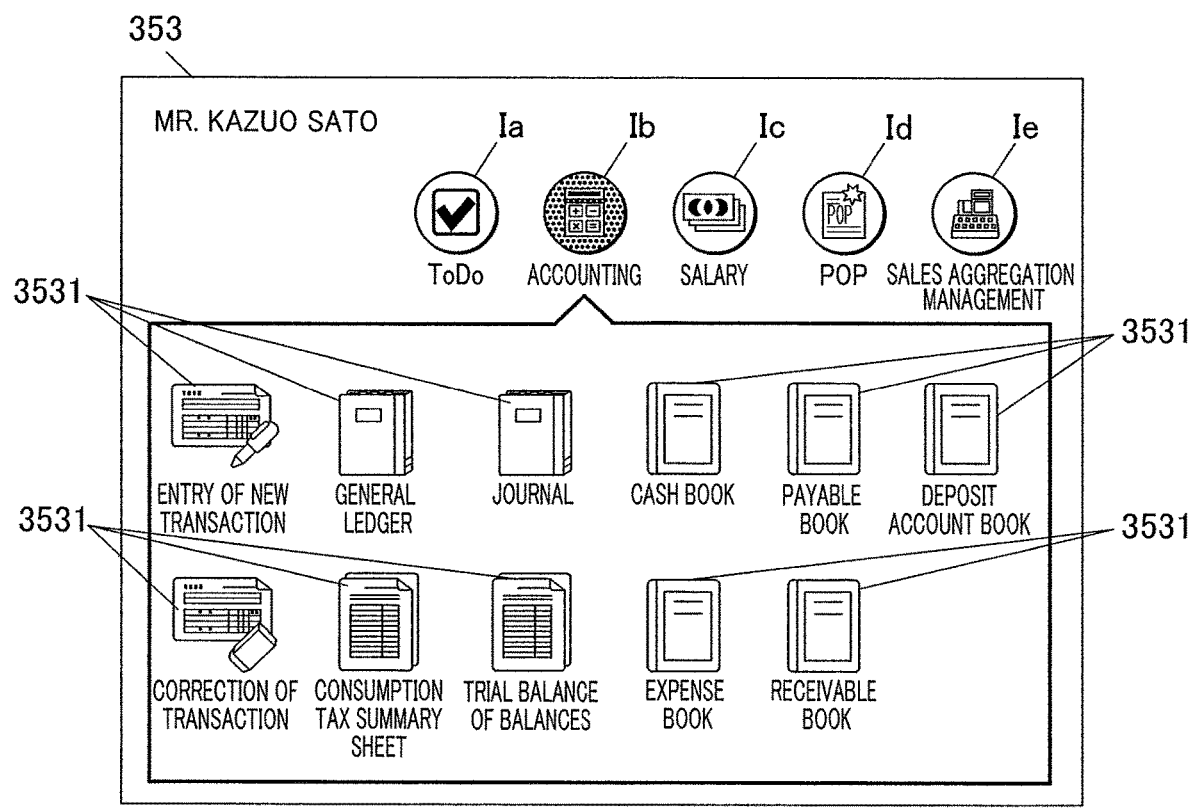
FIG. 8 illustrates a window of an accounting application.
Figure 12A:

If the specialist user performing the proxy login (for example, Mr. "Keigo Aida") wishes to edit the data in a journal used in the accounting process, the icon Ib is clicked or touched on the To Do application window illustrated in FIG. 7 to execute the accounting application program 23h. After the accounting application program 23h is executed, the accounting application window 353 of FIG. 8 is displayed. If the function icon 3531 for "journal" is selected by a click or touch on the accounting application window 353, a journal window 355 related to the function of the journal appears on the display 35 of the terminal 3 as illustrated in FIG. 12A. If a "detail" button B5 in the column to be edited is clicked or touched on a journal window 355, a journal breakdown window 356 is displayed as illustrated in FIG. 12B. If a "transaction edit" button B6 is clicked or touched, the edit of the data (business data) described above is requested.

If the edit is requested in step S108 (step S108; YES), the CPU 21 causes the data to be edited (step S109), and the procedure proceeds to step S110. The details of the edit will be explained below.

If the edit is not requested in step S108 (step S108; NO), the procedure skips step S109 and proceeds to step S110.

The CPU 21 subsequently checks for a proxy logout request to log out from the general user window 352 after the proxy login (step S110).

If the proxy logout is not requested in step S110 (step S110; NO), the procedure returns to step S108 where the CPU 21 performs the determination process.

If the proxy logout is requested in step S110 (step S110; YES), the CPU 21 causes the specialist window 354 (top window) to appear again on the terminal 3 and causes the customer list L to be updated and displayed on the window (step S111).

The CPU 21 subsequently checks for a logout request to log out from the specialist window 354 (step S112).

If the logout is not requested in step S112 (step S112; NO), the procedure returns to step S106, and the CPU 21 performs the determination process of step S106.

If the logout is requested in step S112 (step S112; YES), the CPU 21 finishes the edit of the customer data.

<Edit>

Edit through the management supporting system 1 will now be described in reference to FIG. 11.

The CPU 21 initially causes the window for edit to appear on the display 35 of the terminal 3 (step S121).

Figure 13:
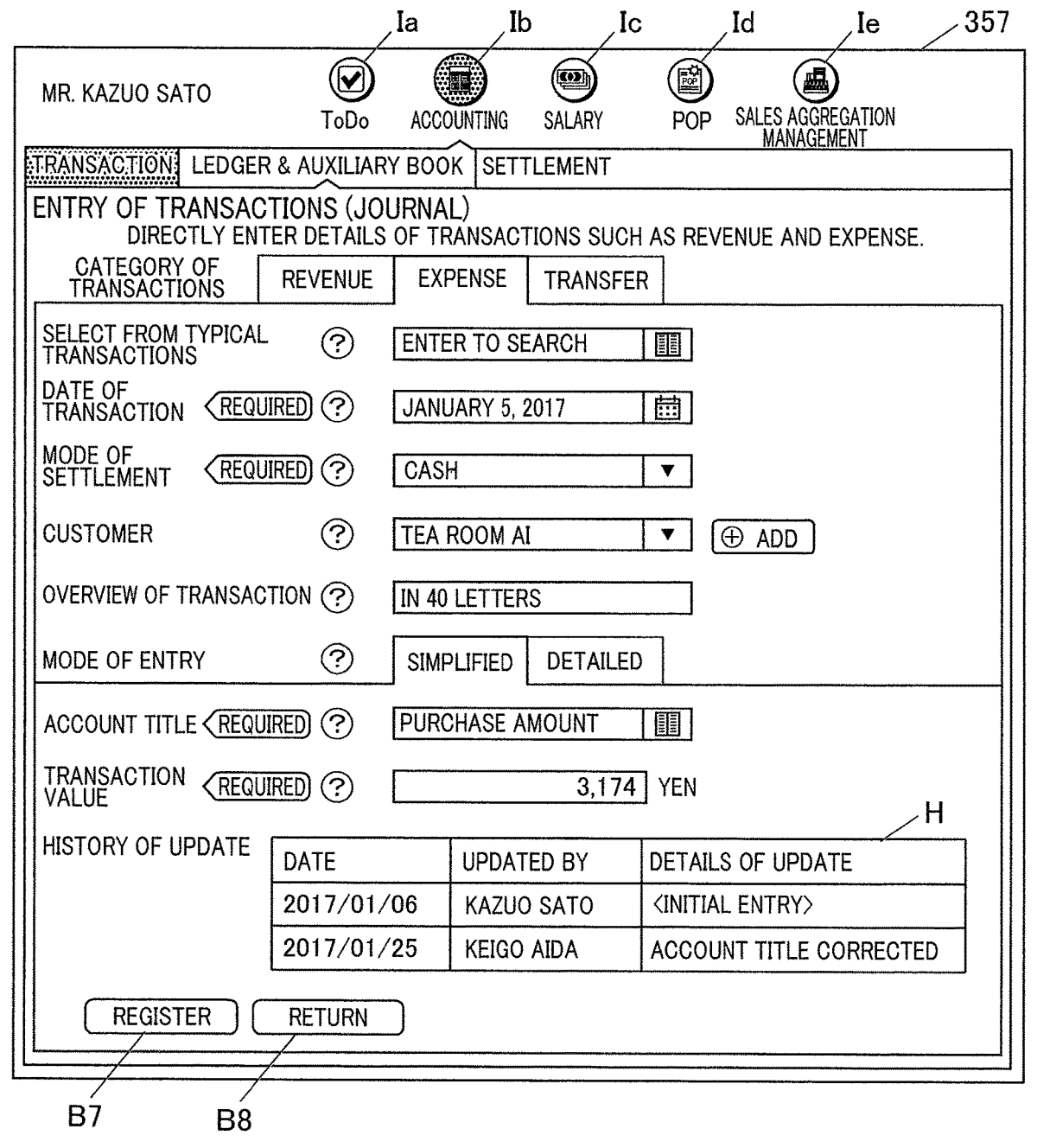

If the specialist user (Mr. "Keigo Aida") clicks or touches the "transaction edit" button B6 on the journal breakdown window 356 illustrated in FIG. 12B, the CPU 21 causes a transaction entry (journal) window 357 to appear on the display 35 of the terminal 3 for edit, as illustrated in FIG. 13. The transaction entry (journal) window 357 for edit is provided with fields for various data entries (for example, transaction date, mode of settlement, customer, overview of transaction, account title, and transaction value). The transaction entry (journal) window 357 is provided with a "register" button B7 to register the edited data and a "return" button B8 to close the window. The transaction entry (journal) window 357 also includes an update history list H on which historical data is added every time the edited or updated data is registered. The update history list H displays the date of edit or update, the names of those who edit or update data, and the overview or details of the update.

The CPU 21 subsequently checks for the operation (click or touch) of the "return" button B8 in step S122. In detail, the CPU 21 checks for the operation of the "return" button 138 through reception of the data indicative of operation of the "return" button B8 via the communicator 26.

If the "return" button B8 is operated in step S122 (step S122; YES), the CPU 21 finishes the edit.

If the "return" button B8 is not operated in step S122 (step S122; NO), the CPU 21 checks for the operation of the "register" button B7 (step S123). In detail, the CPU 21 checks for the operation of the "register" button B7 through reception of the data indicative of operation of the "register" button B7 via the communicator 26.

If the "register" button B7 is not operated in step S123 (step S123; NO), the procedure returns to step S122.

If the "register" button B7 is operated in step S123 (step S123; YES), the CPU 21 checks for update or edit of any of the data in fields (step S124).

If the data in the fields is not updated in step S124 (step S124; NO), the CPU 21 finishes the edit.

If any of the data in the fields is updated in step S124 (step S124; YES), the CPU 21 causes the historical data for the edit to be added to the update history list H (step S125). If the specialist user (Mr. "Keigo Aida") edits the data of the purchase amount in the account title field, the update history list H presents the added historical data, namely the date (2017/01/25), the updater ("Keigo Aida"), and the detail of the update (the account title corrected), as illustrated in FIG. 13.

When the step S125 ends, the CPU 21 finishes the edit.

As described above, the server 2 in the management supporting system 1 according to the present embodiment includes the CPU 21. The CPU 21 (the first login module 211) approves, upon a login request accompanied by entry of correct authentication information on any one of accounts, a request for first login using the account in the account database 23a. The account database 23a includes the registered accounts distinguished between one or more general accounts (first accounts) and one or more specialist accounts (second accounts) being allowed for proxy login using the general accounts. The CPU 21 (the second login module 212) approves, upon a further request for login using any one of the general accounts in a login session started by the first login using any one of the specialist accounts, a request for second login using the general account having a preset proxy for approving the proxy login using the specialist account in the account database 23a.

In this configuration, the specialist user having a specialist account can perform the second login with the general account for which the specialist account is set to a proxy without a separate account to be accessible to the general account. This can minimize an increase in accounts necessary for joint management of business data between the general account and the specialist account. As a result, increases in resources for management of accounts can be controlled, and the resources can be effectively utilized.

In accordance with the embodiment where the account database 23a manages the specialist account and the general account on separate data tables, only the specialist account can be a proxy account, whereas only the general account can be a dependent account. This can prevent the specialist account from being set to dependent account and the general account from being set to a proxy account. Thereby, the occurrence of inconveniences, such as the general account having an inappropriate authorization for the proxy account and proxy establishment like multi-tiered proxy or mutual proxy, can be reduced.

If the first login using the specialist account is performed, the CPU 21 (the display control module 213) causes the specialist window 354 to be displayed that includes the proxy login buttons B4 for entry operation to start the second login using any of the general accounts. If one of the proxy login buttons B4 is selected, the CPU 21 (the second login module 212) approves the second login using the general account. This enables the specialist user to perform the second login with the general account through simple selection of any of the proxy login buttons B4 on the specialist window 354.

If any of the specialist accounts is set to a proxy for the general accounts, the CPU 21 (the display control module 213) causes the proxy login buttons B4 corresponding to the general accounts to appear on the specialist window 354. If one of the proxy login buttons B4 is selected, the CPU 21 (the second login module 212) approves the second login using any one of the general accounts corresponding to the selected proxy login button B4. This enables the specialist user to readily perform the second login with any general account with an intuitive entry operation even if the specialist account of the specialist user is set to a proxy of two or more general accounts.

The CPU 21 (the display control module 213) causes the information on the general accounts and the proxy login buttons B4 to appear on the specialist window 354. This allows the specialist user to readily obtain and compare between pieces of information on the general accounts having proxies.

If the first login or the second login using the general account is performed, the CPU 21 (the display control module 213) causes not the specialist window 354, but the predetermined general user window 352 to be displayed as an initial window. This can separately limit the executable functions at each of the login with the general account and the login with the specialist account, and thus a user can readily perform processes related to functions of interest depending on the account types.

The CPU 21 (the first proxy establishment module 214) associates the general account with the special account in the account database 23a to establish the proxy. The general account is identified based on the information entered by a user in a login session started by the first login using the specialist account. Such a configuration enables the update on the account database 23a to readily modify the setting of the general account allowing for the second login with the specialist account. The user having a specialist account can select a general account to establish a proxy between the general account and his/her own specialist account.

The CPU 21 (the second proxy establishment module 215) associates the specialist account with the general account in the account database 23a to establish the proxy. The specialist account is identified based on the information entered by a user in a login session started by the first login using the general account. Such a configuration enables the update on the account database 23a to readily modify the setting of the general account allowing for the second login with the specialist account. The user having a general account can select a specialist account to establish a proxy between the specialist account and his/her own general account.

The CPU 21 (the second login module 212) approves the second login using the general account regardless of user entry of authentication information on the general account. This enables the specialist user having the specialist account to readily perform the second login using the general account without knowing the authentication information on the general account.

A computer-readable recording medium included in the memory 23 according to the present embodiment is of a non-transitory type storing a computer program causing the CPU 21 (a computer) in the server 2 as an authentication device to execute:

the first login process of approving, upon a login request accompanied by entry of correct authentication information on any one of accounts, a request for first login using the account in the account database 23a including the registered accounts distinguished between one or more general accounts (first accounts) and one or more specialist accounts (second accounts) being allowed for proxy login using the general accounts; and the second login process of approving, upon a further request for login with any one of the general accounts in a login session started by the first login using any one of the specialist accounts, a request for second login with the general account having a preset proxy for approving the proxy login using the specialist account in the account database 23a.

Such a program can control increases in accounts necessary for joint management of business data between the general account and the specialist account. As a result, increases in resources for account management can be controlled, and the resources can be effectively utilized. Thereby, the occurrence of inconveniences, such as the general account having an inappropriate authorization for the proxy account and proxy establishment like multi-tiered proxy or mutual proxy, can be reduced.

In the description above, the computer-readable medium for storing the computer program according to the present invention is the memory 23, for example, a HDD or a SSD. Alternatively, any other computer-readable medium, such as a hand-held recording medium, for example, a flash memory or a CD-ROM, may be used. The program data according to the invention can also be provided on carrier waves through communication lines.

It should be noted that the above description is directed at exemplary embodiments of the authentication device and the computer-readable recording medium according to the present invention and any other modification may be made.

For example, the system that can use the authentication device according to the invention may include any system other than the management supporting system 1. In other words, the present invention may be applied to any system used by ordinary users and managers having proxies established by the ordinary users to be accessible to data.

The embodiment above describes the account database 23a stored in the memory 23 of the server 2. Alternatively, the account database 23a may be stored in an external device other than the server 2.

Of course, the detailed configuration and operation of the components included in the management supporting system 1 of the embodiment may be modified as required without departing from the scope and spirit of the invention.

While several embodiments according to the present invention are described herein, the embodiments should not be construed to limit the invention.

What is claimed is:

1. An authentication device comprising:
   a memory that stores an account data table in which a first account from among plural accounts is set as a proxy account for which a second account from among the plural accounts has a proxy, and in which the second account is set as a dependent account that depends upon the proxy account; and
   a processor configured to execute processes comprising:
   a first login process of, upon receipt of a login request which is accompanied by an entry of authentication information from a user, comparing the entered authentication information with authentication information associated with each of the plural accounts and approving the login request in a case in which it is determined that the entered authentication information matches authentication information of one of the plural accounts;
   a second login process of approving login of the dependent account in a case in which login to the dependent account is requested in a login session started by approval of the login request received in the first login process; and
   a display process of, in a case in which a plurality of dependent accounts that are different from each other are set in the account data table as depending upon the proxy account corresponding to the login session, presenting a list in which a login button and business data are associated with each of the dependent accounts, wherein, in the second login process, in a case in which the user selects a login button from among the login buttons associated with each of the dependent accounts presented in the list, the login of the dependent account with which the selected login button is associated is approved.

2. The authentication device according to claim 1, wherein the proxy account indicates a specialist account, and the dependent account indicates a general user account.

3. The authentication device according to claim 1, wherein the login using the dependent account is approved regardless of user entry of authentication information on the dependent account in the second login process.

4. A non-transitory computer-readable recording medium storing a program thereon that is executable by a computer comprising a memory that stores an account data table in which a first account from among plural accounts is set as a proxy account for which a second account from among the plural accounts has a proxy, and in which the second account is set as a dependent account that depends upon the proxy account, the program being executable by the computer to control the computer to execute processes comprising:

a first login process of, upon receipt of a login request which is accompanied by an entry of authentication information from a user, comparing the entered authentication information with authentication information associated with each of the plural accounts and approving the login request in a case in which it is determined that the entered authentication information matches authentication information of one of the plural accounts;

a second login process of approving login of the dependent account in a case in which login to the dependent account is requested in a login session started by approval of the login request in the first login process; and a display process of, in a case in which a plurality of dependent accounts that are different from each other are set in the account data table as depending upon the proxy account corresponding to the login session, presenting a list in which a login button and business data are associated with each of the dependent accounts, wherein, in the second login process, in a case in which the user selects a login button from among the login buttons associated with each of the dependent accounts presented in the list, the login of the dependent account with which the selected login button is associated is approved.

5. The non-transitory computer-readable recording medium according to claim 4, wherein the proxy account indicates a specialist account, and the dependent account indicates a general user account.

6. The non-transitory computer-readable recording medium according to claim 4, wherein the login using the dependent account is approved regardless of user entry of authentication information on the dependent account in the second login process.

* * * * *